May 23, 1939.　　　　　E. A. PRESTON　　　　　2,159,400

SPRAYING APPARATUS

Filed June 21, 1937　　　　3 Sheets-Sheet 1

INVENTOR.
E. A. Preston
BY Morsell, Lieber & Morsell
ATTORNEYS.

May 23, 1939.  E. A. PRESTON  2,159,400
SPRAYING APPARATUS
Filed June 21, 1937   3 Sheets-Sheet 2
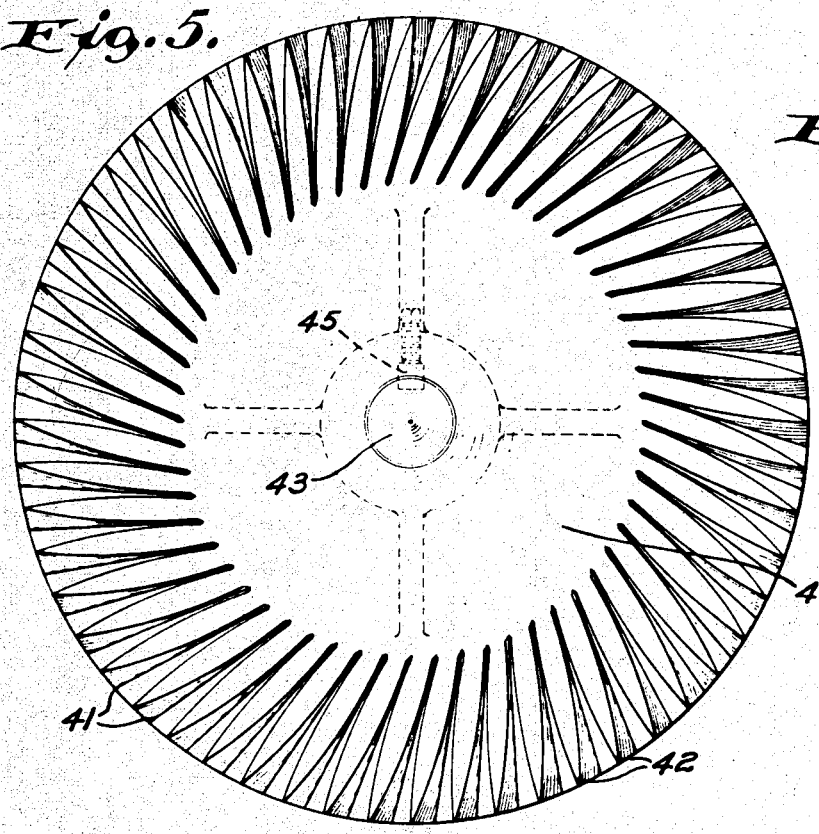
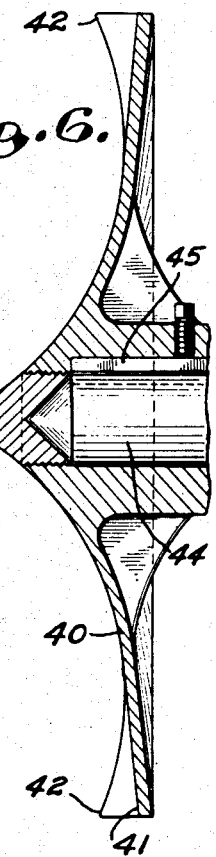
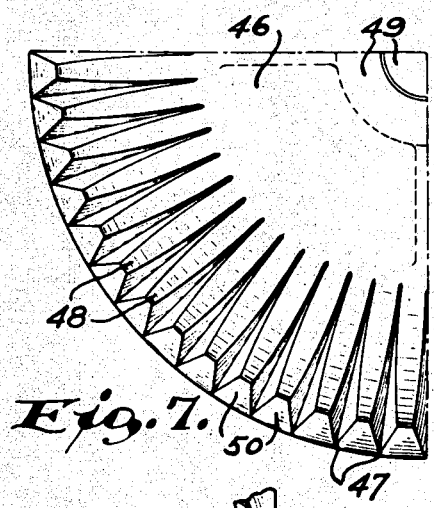
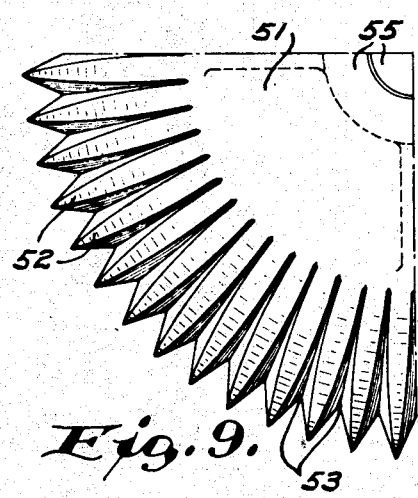
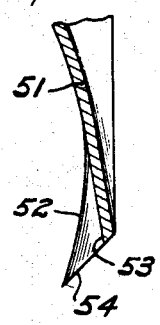
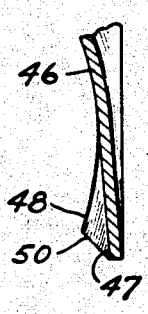
INVENTOR.
E. A. Preston
BY
Morsell, Lieber & Morsell
ATTORNEYS.

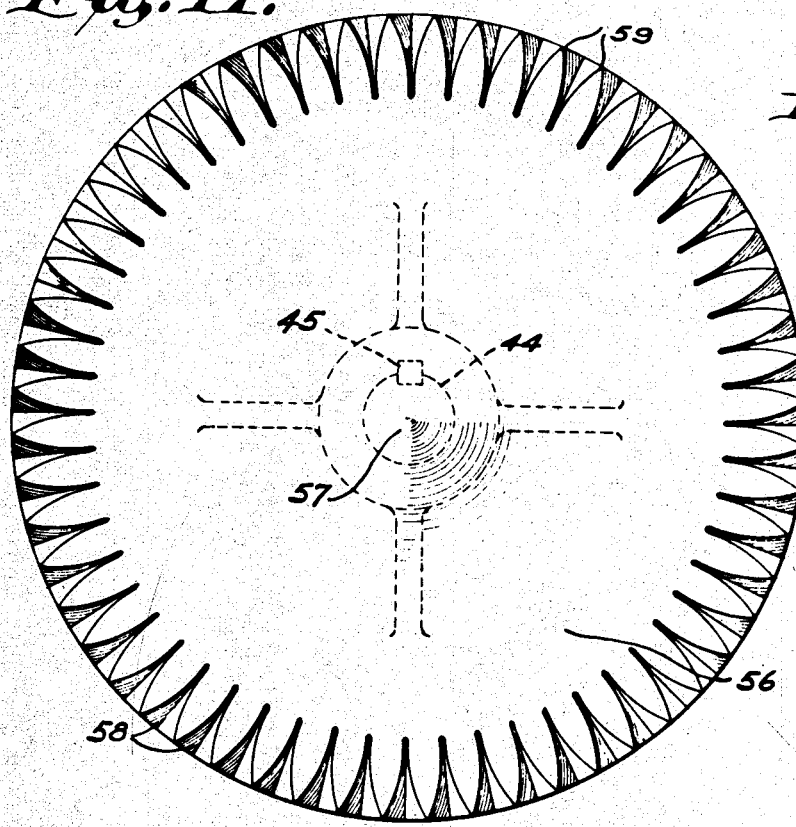
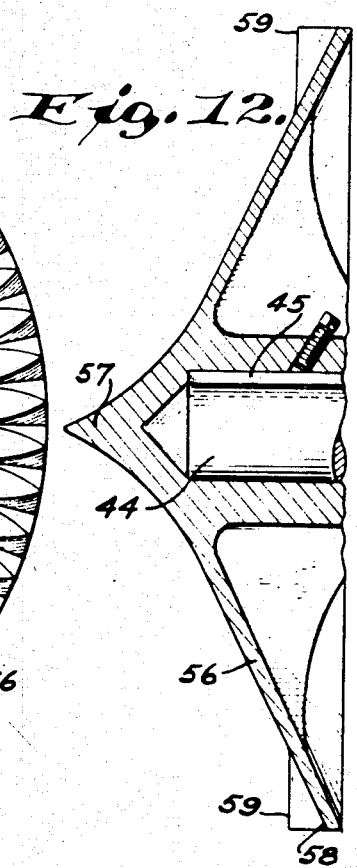
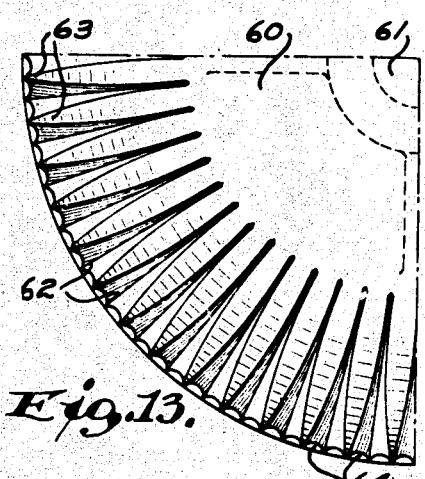
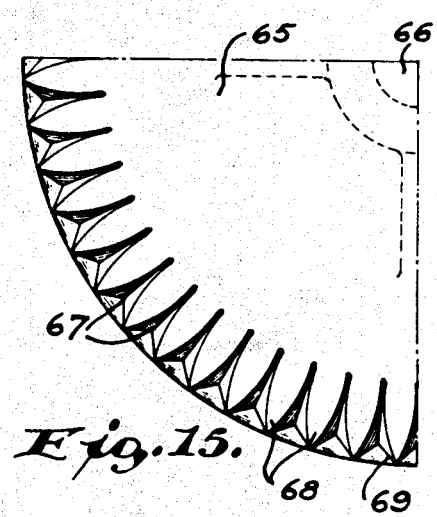
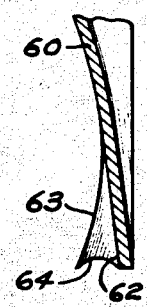
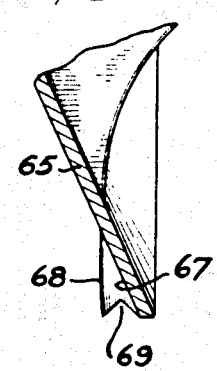

Patented May 23, 1939

2,159,400

UNITED STATES PATENT OFFICE 2,159,400

SPRAYING APPARATUS

Everett A. Preston, Wausau, Wis., assignor to D. J. Murray Manufacturing Co., Wausau, Wis., a corporation of Wisconsin Application June 21, 1937, Serial No. 149,297

20 Claims. (Cl. 299—63)

My present invention relates in general to improvements in the art of utilizing liquid to treat gases either for purification or humidification purposes, or both; and relates more specifically to improvements in the construction and operation of so-called spraying apparatus for washing and scrubbing air and other gases, and for conditioning gases such as air in heating and ventilating systems.

Generally defined, an object of my present invention is to provide improved spraying apparatus for converting liquids of all kinds into spray or vaporous condition, automatically, rapidly, and most effectively.

Many different types of rotors for atomizing and for converting liquids into spray for gas washing and humidifying purposes, have heretofore been proposed and used with more or less success. In one of these prior spray wheels, an annular series of pins is supported from one face of a revolving disk or cone against which a central jet of liquid is delivered axially and is diverted radially across the path of travel of the pins so that the pins disintegrate the liquid and convert the same into spray which is delivered by centrifugal force from the disk periphery. The rapidly revolving pins of this type of spraying apparatus, actually beat the liquid into a spray and cannot be utilized to produce films and sprays having characteristics most suitable for the various classes of work which is to be performed. For example, in certain classes of work it is desirable to produce a relatively uninterrupted film through which the gas or air is caused to travel; while at other times it is desirable to utilize an annular series of radiating films, of which the successive sections are disposed at angles relative to each other so as to provide maximum surface area; whereas coarse or fine spray may be more desirable for still other classes of work. None of the prior spraying devices are adapted to meet all of these various conditions, and while they may be quite effective for one particular kind of use, they are extremely inefficient for other uses.

My present invention therefore contemplates provision of an improved revolving sprayer wherein the nature of the film or spray produced may be quickly and conveniently varied to meet any desired conditions, thereby adapting the apparatus for use for various classes of work such as washing or cleansing gases, or for the removal and reclaiming of valuable particles from gases, or for air conditioning purposes, or for the condensation of liquids such as milk.

Another specific object of the present invention is to provide an improved spray wheel of great strength which may be readily manufactured and which is rotatable at relatively high speeds to produce variable and most efficient results.

A further specific object of my invention is the provision of an improved liquid film producing rotor which is adapted to produce a film of varied form and having extensive area within a limited space, and which is also operable to convert the liquid into coarse or fine spray without subjecting the same to undesirable impact.

Still another specific object of the invention is to provide improved spraying apparatus having maximum utility and adapted for diversified uses in many different industries.

These and other objects and advantages will be apparent from the following detailed description.

A clear conception of the several features constituting the present invention, and of the construction and operation of various types of spray wheels embodying the improvement, may be had by referring to the drawings accompanying and forming a part of this specification, wherein like reference characters designate the same or similar parts in the various views.

Fig. 5 is a full front or plan view of a modified type of wheel having a slightly conical disk provided with serrations somewhat similar to those of Figs. 1 and 2 but disposed tangent to a circle surrounding the rotor axis;

Fig. 6 is a central section through the conical wheel of Fig. 5, showing the mode of attaching the hardened cone point thereto and in line with the wheel axis;

Fig. 7 is a fragmentary plan view of a modification of the wheel shown in Fig. 3, wherein the disk is slightly conical at its periphery instead of being flat as in Fig. 3;

Fig. 8 is a fragmentary section through the peripheral portion of the rotor of Fig. 7;

Fig. 9 is a fragmentary plan view of still an-

Fig. 10 is a fragmentary section through the periphery of the rotor of Fig. 9;

Fig. 11 is a plan view of another type of rotor having a more pronounced conical disk formation with the peripheral serrations quite short;

Fig. 12 is a central section through the wheel of Fig. 11;

Fig. 13 is a fragmentary plan view of a further modified type of rotor having a conical disk and notched periphery;

Fig. 14 is a fragmentary section through the peripheral portion of the wheel of Fig. 13;

Fig. 15 is a fragmentary plan view of an additional type of rotor similar to that of Figs. 11 and 12 but having a notched periphery; and Fig. 16 is a fragmentary radial section through the periphery of the modification of Fig. 15.

While I have specifically illustrated a number of different types of spray wheels embodying my invention, some of which have relatively flat disks while others are of conical or convex and of concave formation, and most of which have different forms of serrations disposed either radially or tangentially, it is not my intent to restrict the scope by such disclosures, since other forms and disposition of the disk and serrations are possible and the apparatus may be used for other purposes than herein specified.

Figure 1:
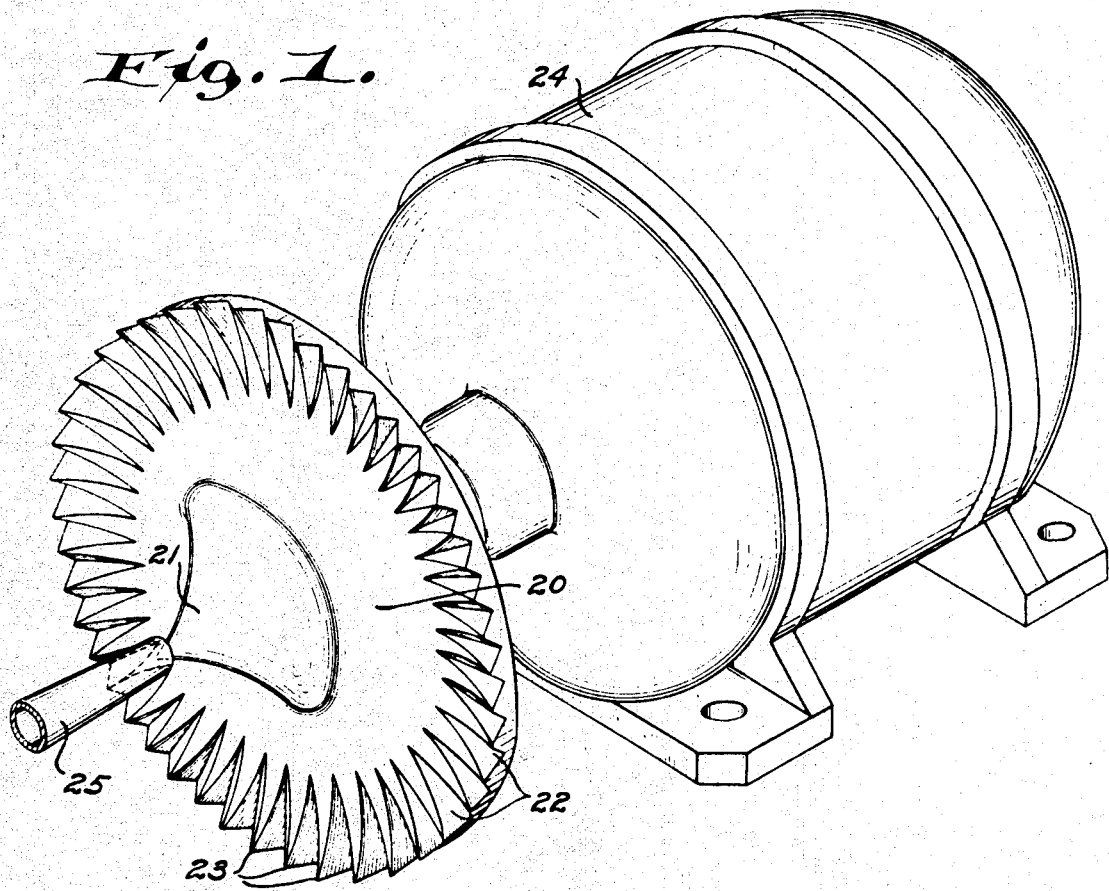
Fig. 1 is a perspective view of a motor driven spray unit including one type of my improved spray wheel.

Referring to the improved spraying unit shown in Fig. 1, this unit comprises in general a film or spray producing assemblage consisting of a circular support or disk 20 having an annularly smooth central cone 21 and a series of radially disposed V-shaped peripheral grooves 22 forming intervening V-shaped serrations 23 of gradually increasing width and height; an electric motor 24 for revolving the disk 20 at any desired speed; and a nozzle 25 for delivering a jet of fluent material such as liquid axially of the rotor and centrally against the apex of the cone 21. The serrations 23 of this particular embodiment of the invention are relatively short and terminate in a circle surrounding the cone 21 but spaced some distance from the base thereof; and the grooves 22 and serrations 23 have smooth side walls, while the tops of the serrations 23 merge into the smooth central face of the disk 20.

Figures 2, 3, 4:
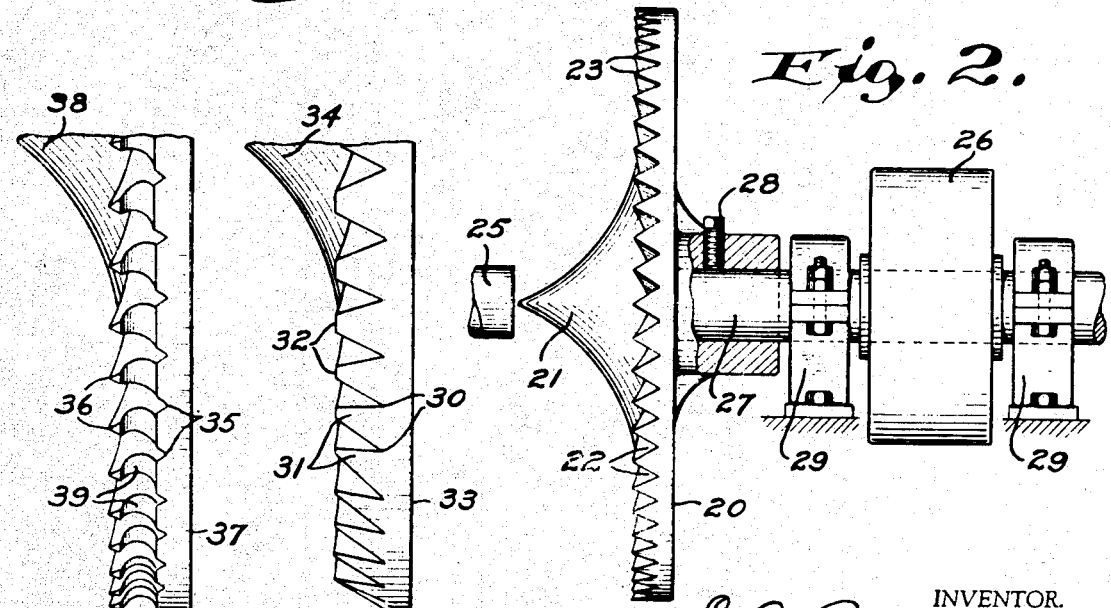
Fig. 2 is a part sectional side elevation of a belt driven spray unit having a rotor similar to that of Fig. 1.
Fig. 3 is a fragmentary side elevation of a modified type of spray wheel having V-grooves and flat topped peripheral serrations.
Fig. 4 is a similar fragmentary side elevation of another type of spray rotor having V-shaped serrations and intervening grooves provided with notched outer ends.

In Fig. 2 I have shown a spraying unit embodying a rotor structure quite similar to that of Fig. 1, but adapted to be driven at any desired speed by means of a belt coacting with a pulley 26 mounted upon a shaft 27 to which the spray rotor is also attached by a set screw 28 or the like. The rotor driving shaft 27 may be journalled in bearings 29, and any other suitable attaching means may be employed in place of the set screw 28.

The rotor wheel of Fig. 3 is somewhat similar to that of Figs. 1 and 2, but while the grooves 30 of this modification are V-shaped, the serrations or ridges 31 have flat upper surfaces 32 which merge into the face of the support or disk 33 near the base of the cone 34.

In the modification of Fig. 4, the grooves 35 and intervening serrations 36 are again V-shaped near the periphery of the flat circular support or disk 37, and these grooves and serrations may be disposed either radial or otherwise and terminate either remote from or near the base of the cone 38. The extreme outer ends of the serrations 36 of this modification are provided with notches 39 forming a peripheral groove surrounding the entire rotor.

As illustrated in Figs. 5 and 6, the support or disk 40 may be of slightly conical shape, and the grooves 41 and intervening serrations 42 may be disposed tangentially relative to a circle surrounding the rotor axis within the periphery thereof. The grooves and serrations of this embodiment are again of V-shape at the disk periphery, and the serrations 42 have flat and smooth top surfaces which merge into the face of the disk 40 while the bounding surfaces of the grooves 41 are smooth. The central cone of this modified rotor is provided with a separable cone point 43 which may be formed of relatively hard or wear resistant material, and the wheel may be secured to a drive shaft 44 by means of a key 45. The degree of tangency of the grooves and serrations may obviously be varied and they may be curved longitudinally, and the tangential disposition of the grooves and serrations may be applied to any of the rotors shown herein which may also be rotated in either direction depending upon the class of service for which they are to be used.

In Figs. 7 and 8 is shown a rotor somewhat similar to that of Fig. 3, but having a slightly conical supporting disk 46 provided with V-grooves 47 and intervening radial or tangential projections 48, the top surfaces of which are flat and longitudinally curved to gradually merge into the base of the central cone 49. The ends 50 of the projections 48, which are located at the periphery of this rotor, are rather abruptly inclined or chamfered so that the highest portions of the serrations terminate considerably nearer the rotor axis than the corresponding ends of the grooves 47.

Figs. 9 and 10 illustrate a further modified type of spray wheel wherein the disk 51 is conical instead of being flat, and in which the serrations 52 are separated by intervening V-shaped grooves 53 and are provided with chamfered ends 54 so formed that the projections or serrations 52 extend outwardly considerably beyond the bottoms of the grooves 53. The serrations 52 and the grooves 53 of this embodiment may be disposed either radially as shown, or tangentially as in Fig. 5; and the elements terminate at the base of the central deflecting cone 55, the serrations 52 again being provided with top longitudinally smooth and curved surfaces merging into the cone surface.

The specific embodiment of the invention shown in Figs. 11 and 12 differs from the preceding embodiments, primarily in the formation of the circular support or disk 56 which is abruptly conical and has a central deflector cone 57 formed even more abruptly conical than the main disk body. The periphery of the conical disk 56 is provided with a series of relatively short V-shaped grooves 58 forming intervening serrations or projections having V-shaped outer extremities and provided with plane top surfaces merging into the conical disk surface. The grooves 58 and projections 59 may be disposed either radially or tangentially, and the rotor may be provided with an integral central hub secured to a driving shaft 44 by means of a key 45 as in Fig. 6.

The modified spray wheel of Figs. 13 and 14 has a slightly conical support or disk 60 generally similar to that of Figs. 9 and 10, this disk being provided with a more abrupt central deflector cone 61 and with peripheral radial or tangential V-grooves 62 and intervening serrations 63, the latter being provided with concave outer end surfaces 64 and with smooth longitudinally curved top surfaces merging into the disk 60.

The spraying rotor of Figs. 15 and 16 is somewhat similar to that of Figs. 11 and 12, and comprises an abruptly conical supporting disk 65 having a central deflecting cone 66 and a peripheral series of grooves 67 and serrations 68, the latter of which have angular notches 69 at their outermost ends and are provided with plane top surfaces merging into the surface of the disk 65.

Although many additional modifications will be apparent to those skilled in the art, it is to be noted that each of the illustrated embodiments of the invention includes a circular support or disk having a smooth central area against and over which fluent material is adapted to be delivered, the periphery of the smooth area being surrounded by an annular series of grooves and intervening projections having smooth bounding surfaces which gradually merge into the smooth central area of the disk. While the fluent material may be delivered upon this smooth central area of the disk in any convenient manner, the use of a central deflecting cone, the base of which gradually merges into the central disk area and the apex of which cooperates with a fluid supply nozzle as shown in Figs. 1 and 2, has proven quite satisfactory. The disk and serrations may be formed integral either by casting, stamping, or machining of material, or in any other manner, which will eliminate electrolysis, and when a separate cone point is utilized, this point may be formed of wear resistant material such as hard metal, or of rubber in cases where the liquid contains excessive abrasive material.

During normal use of any of the improved spray wheels, the wheel may be rotated in either direction at any desired speed, either high or relatively low. As the fluent material such as liquid, is delivered axially and centrally against the apex of the cone, it spreads out in all directions and flows along the surface of the cone in a layer which naturally becomes thinner as it approaches the base of the cone. Upon reaching the smooth central area of the revolving disk, the layer of fluent material is urged outwardly in all directions by centrifugal force and remains unbroken until it reaches the inner ends of the annular series of grooves and serrations. Here the thin layer or film of fluent material is gradually but quickly segregated into sections, some of which advance outwardly within the smooth recesses or grooves and others of which proceed along the top surfaces of the projections or serrations. Upon reaching the periphery of the rotor, the film sections are discharged either in the form of a complete or sectional film, or in the form of coarse or fine spray, depending upon the rate at which the fluid is supplied and upon the speed of revolution of the rotor. This action of the spray wheel is continuous and automatic, and the conversion of the mass of fluent material into a film, films or spray is accomplished automatically and without shock or impact. The nature of the final discharge will be dependent, not only upon the rate of supply of the fluid and upon the speed of rotation, but will also depend upon the direction of rotation and upon the length, disposition and formation of the grooves and serrations.

By forming the rotor without abrupt projections and smooth in the direction of advancement of the fluent material therealong, clogging of the rotor by accumulation of solids thereon is positively avoided; and smooth advancement of the fluent substance along all portions of the wheel is insured. With the type of wheels shown in Figs. 3, 7 and 8, a double film discharge may be readily produced; and with the structures of Figs. 4, 13, 14, 15 and 16 having notched serrations, a relatively thick layer of fine spray may be created about the wheel periphery. If the supply of fluid is abundant, and the wheel is being revolved rather slowly, the types of rotors shown in Figs. 1, 2, 5, 6, 9, 10, 11 and 12 will produce serrated annular unbroken films having large area; and the rotors of Figs. 9, 10, 13, 14, 15 and 16 having serrations provided with pointed outer ends may be utilized to produce special spray effects which are extremely advantageous for certain classes of work. The direction of discharge of the spray relative to the disk periphery can also be varied considerably by varying the wheel speed and the direction of rotation thereof, and also by disposing the serrations tangent either with or against the direction of rotation. It must therefore be apparent that the present invention provides for great diversification in the nature of the final discharge, thus adapting the improvement for many uses in various industries.

The improved spray wheels may be used most effectively for washing and scrubbing air and other gases, for humidifying and dehumidifying air and other gases, for removing solids from liquid, for condensing liquids such as milk, and for many other purposes. The breaking up of the film may be extended to the point of converting the liquid into a vapor, and the apparatus may be thus utilized for cooling as well as for humidifying purposes. The improvement has proven highly satisfactory and extremely flexible in actual use and has clearly demonstrated its superiority over prior spraying apparatus of this type.

It should be understood that it is not desired to limit this invention to the exact details of construction and to the precise mode of operation, herein shown and described, for various modifications within the scope of the claims may occur to persons skilled in the art.

I claim:

1. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery.

2. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery and said cone and said serrations being smooth surfaced in the direction of extent of the latter.

3. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of the cone base to the rotor periphery.

4. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of the cone base to the rotor periphery and rising above said plane at the periphery of the rotor.

5. A spray rotor having a central cone the base of which terminates in a plane disposed approximately perpendicular to the rotor axis and the conical surface of which is smooth in all directions, and also having an annular series of projections and intervening recesses forming an annular continuous serrated surface directed away from said axis and disposed substantially in said base plane, the serrations being of gradually increasing magnitude approaching the rotor periphery.

6. A spray rotor having a central cone the base of which terminates in a plane disposed approximately perpendicular to the rotor axis and the conical surface of which is smooth in all directions, and also having an annular series of projections and intervening recesses forming an annular continuous serrated surface directed away from said axis and disposed substantially in said base plane, the serrations being of gradually increasing magnitude approaching the rotor periphery and being smooth surfaced in the direction of extent thereof.

7. A spray rotor having a central cone the base of which terminates in a plane disposed approximately perpendicular to the rotor axis and the conical surface of which is smooth in all directions, and also having an annular series of projections and intervening recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of said conical surface to the rotor periphery.

8. A spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery.

9. A spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery and said cone and said serrations being smooth surfaced in the direction of extent of the latter.

10. A spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of the cone base to the rotor periphery.

11. In combination, a spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery, and means for directing a jet of fluid against the apex of said cone in line with said axis.

12. In combination, a spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery and said cone and said serrations being smooth surfaced in the direction of extent of the latter, and means for directing a jet of fluid against the apex of said cone in line with said axis.

13. In combination, a spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of the cone base to the rotor periphery, and means for directing a single solid jet of liquid against the apex of said cone in line with the rotor axis.

14. In combination, a spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery, and means for directing a single jet of liquid against the apex of said cone in line with said axis.

15. In combination, a spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery and said cone and said serrations being smooth surfaced in the direction of extent of the latter, and means for directing a single jet of liquid against the apex of said cone in line with said axis.

16. In combination, a spray rotor having a central cone the base of which terminates in a plane disposed approximately perpendicular to the rotor axis, and also having an annular series of V-shaped projections and intervening V-shaped recesses forming an annular continuous serrated surface directed away from said axis and disposed substantially in said base plane, the serrations being of gradually increasing magnitude approaching the rotor periphery and said projections having smooth top surfaces of gradually diminishing width extending from the periphery of the cone base to the rotor periphery, and means for directing a single jet of liquid against the apex of said cone in line with said axis.

17. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being disposed radially relative to said axis and also being of gradually increasing magnitude approaching the rotor periphery.

18. In combination, a spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being disposed radially relative to said axis and also being of gradually increasing magnitude approaching the rotor periphery, and means for directing a jet of fluid against the apex of said cone in line with said axis.

19. A spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being disposed tangent to a circle circumscribing said axis and also being of gradually increasing magnitude approaching the rotor periphery.

20. In combination, a spray rotor having a central cone the base of which terminates in a plane disposed approximately perpendicular to the rotor axis, and also having an annular series of projections and intervening recesses forming an annular continuous serrated surface directed away from said axis and disposed substantially in said base plane, the serrations being disposed tangent to a circle circumscribing said axis and also being of gradually increasing magnitude approaching the rotor periphery, and means for directing a jet of fluid against the apex of said cone in line with said axis.

EVERETT A. PRESTON.